2,922,732

FIBER-REINFORCED RESIN-BEARING TISSUES, FILMS OR SHEETS, AND ARTICLES OBTAINED THEREFROM

Robert P. Hopkins, Ardsley, and Harold C. Young, Philadelphia, Pa., assignors to Rohm & Haas Company, Philadelphia, Pa., a corporation of Delaware No Drawing. Application December 11, 1956
Serial No. 627,552

16 Claims. (Cl. 154—46)

This invention relates to fiber-reinforced resin-bearing tissues, films or sheets, articles obtained therefrom, and methods of producing them. It is particularly concerned with the production of resin-carrying tissues of high wet strength paper carrying thermoplastic resins in particulate form and adapted to be converted into continuous sheets useful as self-supporting wrapping materials, as laminating inter-layers or as overlays for modifying, such as decorating or protecting, the surfaces of other bases. The invention is also concerned with methods for producing the fiber-reinforced tissues carrying the thermoplastic resin, the fused sheet materials, laminated articles and decorated articles therefrom. This application is a continuation-in-part of our copending application Serial No. 528,122, filed August 12, 1955, now abandoned.

It is a primary object of the present invention to provide a thin fibrous tissue carrying a thermoplastic resin in particulate form on the surfaces and in the interstices between the fibers of the tissue. A further object is to provide a tissue of this type which is of non-blocking character so that a plurality of sheets thereof may be stacked or a continuous sheet thereof may be rolled upon itself without encountering difficulties of adhering together. Another object of the invention is to provide a partially transparentized flexible self-supporting fiber-reinforced resin sheet having the general appearance and character of a glassine paper and having resistance to oil, grease, and water. Another object is to provide a substantially completely transparent fiber-reinforced film, pellicle or sheet. Another object of the invention is to provide laminated structures comprising at least one layer formed from the thermoplastic resin particle-carrying tissue sheet mentioned hereinabove. A more particular object is to provide a laminated article comprising a porous substrate, such as one of fibrous structure, on at least one face of which there is superposed a substantially transparent fiber-reinforced film or layer obtained from the aforementioned thermoplastic resin particle-carrying sheet. It is another object of the invention to provide methods for producing the various films, sheets and laminated articles just referred to. Other objects and advantages of the invention will be apparent from the description thereof hereinafter.

The basic material with which the present invention is concerned generally comprises a fibrous tissue of high wet strength having its fibers in generally haphazard array and carrying on its surfaces and within the interstices between the fibers particles of at least one water-insoluble thermoplastic resin of addition polymer type having a $T_i$ valve (defined hereinafter) of 45° to 90° C. Preferably, the $T_i$ value should be at least 55° C. to minimize the tendency of the copolymer to adhere to the platens or other surfaces of the molding equipment and to eliminate the need for mold lubricants, such as silicones that may be resorted to to prevent such adhesion. It is an essential characteristic of this basic material that the thermoplastic polymer is carried in particulate form rather than in the form of a continuous film or coating. The particles are of extremely small size, generally being of the order of less than one micron as a result of their being deposited from an aqueous dispersion of the polymer at a temperature below the $T_i$ temperature of the particular polymer. However, this basic material may comprise a substantial proportion of particles of the resin of greater size resulting from partial agglomeration of the resin particles deposited from the dispersion. In any event, the resin is in the form of a discontinuous coating, that is, the polymer is carried on the tissue in the form of essentially discrete particles which may be in direct contact with adjacent particles but not coalesced therewith. The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The fibrous tissue may have a weight within a wide range from that of a paper of so-called 4-pound basis weight to one of a 40-pound basis weight, that is, it is a thin tissue weighing from 4 pounds to 40 pounds per 500 sheets having a size of 2 feet by 3 feet. This tissue must be of a type adapted to hold together when treated with aqueous media, and for this purpose it may contain from 1% to 3%, on the weight of the fiber, of various materials imparting wet strength, especially aminoplasts such as condensates of melamine or urea or mixtures thereof with formaldehyde, or polymers of ureidoethyl vinyl ethers which are disclosed in U.S. Patent 2,734,890. The pulp from which the papers are made may be bleached or unbleached, sulfite, kraft, α-cellulose fibers, rag fibers or mixtures thereof.

Besides high wet strength papers obtained by conventional paper-making procedures in which the fiber is deposited on a screen from a suspension thereof in water, similar fibrous tissues of the so-called "non-woven" type may be employed provided they are so constituted as to hold together while being subjected to an aqueous impregnation operation. For example, such a tissue may be formed from a mixture of potentially adhesive fibers with non-adhesive fibers of either textile-making or paper-making lengths. Potentially adhesive fibers may include fibers made of thermoplastic or thermosetting resins, such as vinyl or acrylic polymers of which copolymers of vinyl chloride with vinyl acetate are typical. The potentially adhesive fibers may also be cellulosic fibers impregnated or coated with thermosetting resin condensates, such as of melamine or urea or mixtures thereof with formaldehyde. As non-adhesive fibers, there may be employed cellulosic fibers, such as those of cotton, regenerated cellulose, wood pulp, alpha cellulose or of vinyl or acrylic resins which have a high point of fusion so that they are not fused under the normal temperatures of operation in making the high wet strength tissue. The comingled fibers may be distributed in the form of a web by means of a carding operation or by blowing the fibers through an air path onto a fiber-collecting screen, preferably in the form of an endless belt continuously driven so as to introduce an uncovered section of the screen to the point of decomposition and to continuously remove the fiber-covered portion of the screen from that point. The potentially adhesive fibers in the web may be subjected to moderate heat and pressure to effect partial fusion of the potentially adhesive fibers without loss of their identity as fibers to thereby bind fibers in the product and impart adequate resistance to water. The proportion of potentially adhesive fibers may vary from 20% to 50% or more as desired.

The high wet strength tissue, in lighter weights of less than 10-pound basis weight, should have a wet strength of at least 0.04 pound per inch per pound of basis weight, and when the tissue is in the heavier part of the range from 10-pound basis weight and up, it should have a wet strength of at least 1.3 pounds per inch or a minimum of 35% wet strength which may be obtained by any of the procedures described hereinabove.

In making the articles of the invention, the tissue is coated with an aqueous dispersion of a thermoplastic polymer having a $T_i$ of at least 45° C. and the coated tissue is then dried at a temperature below the $T_i$ so as to avoid coalescence of the polymer particles during the drying operation. The aqueous dispersion may be applied by any suitable means such as by spraying, by transfer rollers, by immersion or by dipping of the sheet in the dispersion and so on. Preferably, a system is employed that is adapted to continuous operation. For example, a continuous sheet of the tissue may be withdrawn from a roll and passed over a transfer roller for applying the aqueous resin dispersion and then through a drying zone to a collecting or winding stage. Also, the impregnation or saturation of the tissue by the polymer dispersion may be effected on the paper-making machine on which the tissue itself is produced, such as on an extension of the drying end thereof. In this system, for example, the wet-strength resin may be mixed with the fibers in the wet end of the machine, as in the beater or stuffbox, and after sheeting and drying, the wet-strength tissue may pass directly from the drying cylinders through a size box containing the polymer dispersion or over a transfer roll applicator system fed with the dispersion and then to a final drying stage. The temperature of the final drying stage is kept below the $T_i$ of the polymer to assure deposition thereof in particulate form. However, if it is desired for any reason to form the polymer into a continuous, transparent or translucent film containing the fibers embedded therein along a certain length of the polymer-dispersion-impregnated tissue or along the entire length, the temperature of the final drying stage may be raised to a point substantially above the $T_i$ value of the polymer to coalesce the polymer particles along the length desired, and such coalescence may be assisted by a calendering action.

The monomers that may be used to form the polymers of proper $T_i$ value include alkyl methacrylates in which the alkyl groups have from 1 to 4 carbon atoms, also t-amyl methacrylate or acrylate, cyclohexyl acrylate or methacrylate, benzyl acrylate or methacrylate, acrylonitrile, methacrylonitrile, styrene, vinyl chloride, chlorostyrene, and p-methylstyrene. While homopolymers of these monomers are generally suitable provided they have a $T_i$ of 45° to 90° C., one or more of these monomers may be copolymerized with one or more monomers which, when polymerized alone, form homopolymers of $T_i$ below 45° C. Examples of these co-monomers include methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, ictadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, octadecyl methacrylate, butoxyethyl acrylate or methacrylate, or other alkoxyethyl acrylate or methacrylate, etc. The monomers of the latter type thus include, as a preferred class, the alkyl acrylates and methacrylates having 6 to 18 carbons in the alkyl group, and acrylates of primary and secondary alcohols having 1 to 5 carbon atoms.

The proportion of the comonomer or comonomers just mentioned that may be used in a given polymer is selected to provide in the final copolymer a $T_i$ value of at least 45° C. The aqueous polymer dispersions that may be applied to the tissue for forming the resin-carrying tissues of the present invention are most advantageously prepared by emulsifying, preferably with a non-ionic dispersing agent, and polymerizing and copolymerizing, preferably under the influence of a peroxidic free radical catalyst, one or more of the monomers mentioned above. The emulsifying or dispersing agent used for emulsifying the monomers used in the emulsion polymerization may be of such character as to assist in the penetration of the tissue by the polymer dispersion thereby obtained. However, penetration may be further enhanced by the addition to the polymerization system, either before or after polymerization, of a wetting agent in an amount of 0.5 to 3% on the weight of polymer. Examples of suitable wetting agents include alkylphenoxypolyethoxyethanols containing 8 to 40 or more oxyethylene units and an alkyl group having 8 to 18 carbon atoms, such as t-octyl, decyl, dodecyl, hexadecyl, and octadecyl; higher fatty acids, mercaptans, or alcohols having 8 to 18 carbon atoms modified by condensation with ethylene oxide (8 to 100 moles); alkali metal salts (Na, K, Li, $NH_4$) of di-octyl-sulfosuccinic acid; higher fatty alcohol sulfates, such as sodium lauryl sulfate, and so on.

The aqueous resin dispersion may have a concentration of 15 to 60% polymer and is preferably between 25 and 40% polymer at the time of application to the tissue. The higher the concentration, the easier it becomes to apply large proportions of the polymer on the fibers of the tissue and the more transparent the fiber-reinforced product after coalescence of the polymer particles. The rate of application of the aqueous dispersion to the tissue may vary widely. For example, it may be such as to provide on the final dried tissue from 2 to 6 pounds of polymer per thousand square feet of a 10-pound weight tissue. Generally the amount of the polymer is from 60% to 700% by weight, based on the weight of the fibers in the tissue. The higher the proportion of polymer, the greater the transparency usually obtained.

The impregnated or coated tissue is dried at normal room temperature or at elevated temperatures short of the $T_i$ value of the particular polymer applied. Temperatures in excess of the $T_i$ value of the polymer even up to 100° C. or higher may be applied in the early stage of drying, but the temperature is preferably reduced to a point below the $T_i$ value before such an extent of drying has occurred that there is a tendency for the particles to coalesce and form a continuous film on the sheet. Alternatively, the drying may be effected at relatively high temperatures provided the rate of evaporation is sufficiently high that substantial coalescence of the polymer particles is not effected.

The resulting coated tissue product is adapted to be stacked in the form of sheets or, if in the form of a continuous sheet, it is adapted to be rolled on itself without encountering difficulties with blocking. This basic material is of stable character and adapted to be stored and shipped without undergoing deterioration at normal conditions of temperature and humidity. It provides a flexible convenient source of thermoplastic resin adapted to be converted into a transparent or translucent, glassine type sheet, an interlayer of a laminater article or an overlay for bases to be protected or decorated thereby.

The flexible tissue carrying the particulate thermoplastic polymer may be converted to a self-sustaining film, pellicle, or sheet similar in character to a glassine type of paper by subjecting it to temperatures substantially above the $T_i$ value of the polymer, preferably a temperature of at least 10° to 20° C. above this value, while under pressure to effect coalescence of the polymer or polymers. For example, a continuous sheet of the coated tissue may be fed through heated metal rolls. Alternatively, a sheet of the coated tissue may be subjected to heat and pressure between smoothly polished hot metal plates. Temperatures of about 90° to 200°

C. may be employed and pressures of 15 to 2000 or more lbs./square inch may be used. The time of pressing may vary widely from about one second to about five minutes. When heavier tissues of about 10-pound to 40-pound basis weight are used, the pellicle thereby obtained is only partially transparentized apparently because of the fiber density and the high $T_i$ value of the polymers. It has the general appearance of a fused polymer with glossy smooth surfaces and transparent areas interspersed with numerous white, cloudy areas. Some cloudiness persists even when the high pressures and temperatures mentioned are employed. Although the sheet still retains the fibrous reinforcement, the fibers generally are not apparent. This product is grease-proof and oil-proof and quite resistant to the transmission of water. It is useful as a decorative material and as a wrapping material, especially for greasy or oily articles. This pellicle may be of various thicknesses from about one mil to about 5 mils. For greatest flexibility, a thickness of 1 to 2 mils is preferred. On the other hand, when lighter tissues are used having from 4-pound to about 9-pound basis weight, and there is used about 300 to 700% polymer on the fiber weight, completely transparent, flexible pellicles are obtained which are grease-proof, oil-proof, resistant to transmission of water. These pellicles may have thicknesses from about ½ mil to 5 mils and are useful as a wrapping material or as a decorative material. All of the pellicles are stable and permanently flexible since they contain no migrant plasticizer.

The particulate thermoplastic resin-bearing tissues which are completely opaque may also be used as cementing interlayers in the making of laminated structures. For example, one or more thicknesses of such a tissue may be interposed between each two layers of a multi-layer laminate and subjected to heat and pressure to effect bonding between the several layers to form an integral multi-layer laminate structure. The layers that may thus be joined include layers of wood, cardboard, and so on.

The particulate resin-carrying tissues may also be used as overlays for application to substrates of various types, such as of wood, cardboard, and the like. In using the tissue as an inter-layer for a laminate or as an overlay, the assembly of the several layers including the inter-layer or overlay may be subjected to heat and pressure, such as to a temperature of about 90° to 180° C. and a pressure of 15 lbs. per square inch to 2000 lbs. per square inch. The higher the value of the $T_i$ for the particular polymer carried by the tissue, the higher the temperature and pressure generally used to effect fusion of the resin particles and bonding of the inter-layer or of the overlay to the adjacent layers or base respectively.

It has been discovered surprisingly that when the heavier resin-carrying tissue that is normally not convertible to complete transparency is applied as an overlay to porous substrates such as paper or paperboard bases, unglazed ceramics, untempered Masonite panels formed from exploded cellulose or hemicellulose gypsum boards used in construction as wall or ceiling panels, fibrous ceiling tiles, leather, and felts or felt-like structures, such as the so-called "non-woven" fabrics, subjection of the assembly of the overlay on the substrate to heat and pressure even in the lower portions of the ranges given above substantially completely transparentized the overlay. This is surprising since, as pointed out above, the subjecting of such a resin-carrying tissue to heat and pressure even in the upper portions of the ranges specified above between polished metal platens or cauls converts the tissue into a continuous thin film or pellicle having transparent areas interrupted by numerous clouded areas amounting to as much as 40% to 70% of the entire area of the pellicle. It appears that there is some peculiar synergistic action between the porous substrate and the resin-carrying tissue during the heat and pressing stage. This transparentizing action does not occur on non-porous substrates such as polished metal or a glass substrate even under drastic conditions of temperature and pressure such that the continuous pellicle or film formed tends to become slightly yellow because of degradation or deterioration of some sort. The pressing of the resin-carrying tissue against a porous substrate, however, converts it to a substantially completely transparent condition even under temperatures and pressures of such mild degree that there is no tendency to deteriorate and become discolored or yellow. The overlay tissue of the present invention is, therefore, surprisingly useful, whether obtained from a light-weight (4- to 9-pound basis weight) or a heavy weight (10- to 40-pound basis weight) tissue, for providing protective and decorative transparent coatings or layers on printed porous substrates such as documents, photographs, or labels which it is desired to preserve or protect from weathering or deterioration during storage under normal temperature and humidity conditions.

The application of the resin-carrying tissue to porous substrates and conversion thereof to transparent protective overlays on the substrate serves to preserve the substrate and to protect it from moisture, oil, grease, oxygen, and so on. The coated substrates are also free of blocking tendencies under all normal conditions of storage because of the high $T_i$ value of the polymer employed. For this reason, documents or other papers provided with a transparent protective coating by the present invention may be stacked without danger of such adhesion that they would be damaged on subsequently removing the several documents from the stack.

In the following examples which are illustrative of the present invention, the parts are by weight unless specifically indicated:

Example 1

(a) A 10-pound basis weight paper tissue (10 pounds per 500 sheets of 2' x 3' dimensions) made from a bleached sulfite pulp and having a wet strength of 1.3 lbs. per inch as a result of impregnation during the paper-making operation with 2% of a urea-formaldehyde condensate is passed continuously through an aqueous dispersion containing about 25% of a copolymer of about 75% acrylonitrile with 25% ethyl acrylate. The copolymer has a $T_i$ value of 80° C. The sheet is dried at a temperature of 60° to 70° C. leaving a tissue carrying a deposit of extremely fine particles of the copolymer, the weight of the copolymer being 100%, based on the weight of fiber in the tissue. The resin-carrying tissue thereby obtained is completely opaque and white. It retains its flexibility and the resin particles are sufficiently adhered to the paper or carried within interstices of the fiber therein so that it can be handled without appreciable dusting or rubbing off of the resin particles without requiring extreme precautions. The resin-carrying tissue may be stacked on itself or a continuous length of the tissue may be wound into a roll without exhibiting any tendency to block.

(b) The resin coated tissue of part (a) hereof is subjected to a temperature of 110° C. and a pressure of 300 p.s.i. (pounds per square inch) between polished metal platens and cooled. The product obtained is a thin film or pellicle, highly flexible, which is transparent in some areas but contains clouded areas amounting to about 70% of the area of the sheet. The surfaces of the pressed pellicle are smooth and highly glossy and the fibers are not apparent as distinct fibers even in the clouded areas of the pellicle. Another portion of the resin-carrying tissue of part (a) is subjected to severe pressure conditions between polished metal plates, namely a temperature of 180° C. and a pressure of 1000 p.s.i. The severe conditions resulted in a pronounced yellowing of the sheet, but even under these severe conditions clouded areas remained amounting to about 40% of the area of the pellicle. As in the first pressing operation, the surfaces of the pellicle are glossy and smooth and the fibers are not apparent or identifiable as fibers even in the clouded areas of the pellicle. The pellicles obtained by these pressing operations are useful as grease-proof, oil-proof and oil-resistant wrapping materials.

(c) A portion of the product of part (a) hereof is interposed between two plys of 1/16" birch wood arranged with the grain of each transverse to that of the other. The temperature is 120° C., the pressure is 200 p.s.i. and the time of pressing is five minutes. A strongly adhered plywood is obtained which is resistant to delamination when subjected to high humidity atmospheres.

(d) A printed label stock paper is interposed with a portion of the tissue obtained in part (a) hereof and the assembly is subjected between smooth metal platens to a temperature of 116° C. and a pressure of 800 p.s.i. On cooling within the press, the label is coated with a clear transparent coating of the resin exhibiting negligible cloudiness. The coating is extremely glossy and smooth and resists moisture, oil and grease.

(e) A similar label stock paper carrying printing thereon has superimposed on its printed face four layers of the resin-carrying tissue obtained in part (a) hereof. On pressing at 121° C. temperature and 600 p.s.i. for three minutes and cooling in the press, the sheet obtained exhibits a smooth glossy surface and the protective coating is substantially completely transparent, the printing being fully legible even with the four thicknesses of the coating applied. Cloudiness is not appreciably noticeable even with this thickness of the overlay.

Example 2

(a) A 30-pound basis weight bleached sulfite paper (30 pounds per 500 sheets of 2' by 3') having a wet strength of 4.0 pounds per inch obtained by the impregnation of the pulp from which the sheet is obtained with 2% of melamine-formaldehyde condensate is passed through an aqueous dispersion containing 45% of a copolymer of 14% ethyl acrylate, 53% methyl methacrylate, and 33% acrylonitrile having a $T_i$ value of about 53° C. After drying at a temperature of 40° C., an opaque white flexible tissue is obtained carrying the particles of resin sufficiently adhered to allow normal handling without excessive dusting.

(b) A partially transparent pellicle useful for wrapping purposes is obtained from a portion of the tissue obtained in part (a) hereof by subjecting the tissue between smooth metal platens to a temperature of 149° C. and a pressure of 1000 p.s.i. for three minutes and cooling between the platens. The pellicle obtained contains a large proportion of cloudy areas but has smooth continuous glossy surfaces and the fibers are not discernible as such even in the cloudy areas.

(c) A printed paper is placed in a press with a portion of the tissue obtained in part (a) hereof superimposed on its printed face. The assembly is pressed between metal platens at a temperature of 107° C. and a pressure of 15 p.s.i. for a period of 1½ minutes and cooled. The protective coating obtained on the printed base has a smooth glossy surface and is substantially completely transparent so that the printing is fully legible.

Example 3

(a) A 20-pound basis weight tissue (20 pounds per 500 sheets of 2' by 3') obtained from a mixture of alpha-cellulose with rag stock fibers and having a wet strength of 2.6 pounds per inch obtained by the incorporation within the pulp during the paper-making process of ½% of a homopolymer of ureidoethyl vinyl ether having a molecular weight of about 50,000 is passed through an aqueous dispersion containing about 40% of a homopolymer of methyl methacrylate having a $T_i$ of about 72° C. On drying at a temperature of 60° C. an opaque tissue is obtained carrying on its surfaces and on the interstices between its fibers fine particles of the polymer. The particles adhere well so that the tissue can be handled without requiring extreme care to prevent excessive dusting. The tissue is free from blocking so that sheets thereof may be stacked in a pile or a continuous sheet may be rolled on itself as a winding without difficulty in separating the sheets or unwinding the roll.

(b) A printed paperboard is placed in a press and a layer of the tissue obtained in part (a) hereof is superimposed on the printed face of the board. The assembly is subjected to a temperature of 107° C. and a pressure of 600 p.s.i. for a period of two minutes between smooth metal platens and cooled. The board obtained has a smooth glossy protective coating substantially completely transparent so that the legibility of the printing is undiminished by the protective surface thereof. It is oil-proof, grease-proof and resistant to water.

Example 4

(a) The procedure of Example 2(a) is repeated substituting for the aqueous dispersion an aqueous dispersion containing 30% of a copolymer of 75% of methyl methacrylate with 25% of butadiene having a $T_i$ of 46° C. The opaque white paper obtained after drying is free from blocking and substantially free of dusting tendencies when normal care is taken to avoid excessive abrasion.

(b) The resin-carrying tissue of part (a) hereof is subjected between polished metal plates to a temperature of 116° C. and a pressure of 600 p.s.i. for a time of 3 minutes and then cooled while in the press. A continuous flexible pellicle is obtained having smooth high glossy surfaces. It has transparent areas interspersed with cloudy areas, the latter amounting to about 60% of the total area of the pellicle. It is grease-resistant, oil-resistant, resistant to water and has adequate flexibility to adapt it for wrapping purposes.

(c) A printed paperboard is placed in a press and a layer of the tissue obtained in part (a) hereof is superimposed on the printed face of the board. The assembly is subjected to a temperature of 107° C. and a pressure of 15 p.s.i. for a period of one minute between smooth metal platens and cooled. The board obtained has a smooth glossy protective coating substantially completely transparent so that the legibility of the printing is undiminished by the protective surface thereof. It is oil-proof, grease-proof and resistant to water.

Example 5

A 5-pound basis weight tissue having a wet strength of 0.22 pound per inch is dipped and held for 15 seconds in an aqueous dispersion containing 1% of a t-octylphenoxy-polyethoxyethanol having about 10 oxyethylene units and 49% of a copolymer of 47% ethyl acrylate, 47% acrylonitrile, and 5% methacrylic acid. The tissue is allowed to drain and oven-dried at 80° C.

When the resulting tissue which carries the polymer in particulate form is pressed 5 minutes between polished cauls heated to 150° C. at a pressure of 2000 p.s.i., and then cooled, a substantially transparent flexible pellicle is obtained.

Example 6

(a) Several pieces of a 4-pound basis weight tissue having a wet strength of 0.17 pound per inch are impregnated by immersing for 15 seconds in one of several polymer dispersions, each containing 40% of a mixture of two polymers A and B. The polymer content of the first dispersion consisted of 80% of polymer A (a copolymer of about 89% of methyl methacrylate, about 10% of ethyl acrylate, and about 0.5% methacrylic acid) and 20% of polymer B (a copolymer of about 66% of ethyl acrylate, 32.7% methyl methacrylate, and about 1.3% of methacrylic acid). The second dispersion contained 70% of polymer A and 30% of polymer B. The third dispersion contained 60% of polymer A and 40% of polymer B. The tissues are allowed to drain and dried at about 80° C. They carried the polymer blends in particulate form in the following amounts based on the weight of fiber in the tissue: 1st, 530%; 2nd, 525%; and 3rd, 612%. After pressing between polished cauls for two minutes at 2000 p.s.i. and 150° F. caul temperatures, films of excellent clarity and transparency and of cellophane-like appearance are obtained. The polymer-particle carrying tissues are also laminated to paper and wood bases under the same pressing conditions as above. The products show good resistance to water at temperatures up to 60° C.

(b) The procedures of part (a) are repeated using 8-pound basis weight tissues having a wet strength of 0.55 pound per inch. The polymer blend deposits on the tissues amounted to: 1st, 335%; 2nd, 400%; and 3rd, 477%. The products are similar to those of part (a).

It is to be understood that changes and variations may be made without departing from the spirit and scope of the invention as defined in the appended claims.

We claim:

1. An article of manufacture comprising a fibrous tissue having a wet strength of at least 0.04 pound per inch per pound of basis weight comprising haphazardly arranged fibers carrying particles of a water-insoluble thermoplastic synthetic addition polymer having a $T_i$ value of at least 45° C. and comprising units derived from at least one monomer selected from the group consisting of alkyl methacrylates in which the alkyl group has 1 to 4 carbon atoms, t-amyl methacrylate, t-amyl acrylate, cyclohexyl acrylate, cyclohexyl methacrylate, benzyl acrylate, benzyl methacrylate, acylonitrile, methacrylonitrile, styrene, vinyl chloride, chlorostyrene, and p-methyl styrene, the total weight of the tissue not including the polymer particles being from 4 to 40 pounds per 500 sheets of 2' by 3' dimensions, said tissue being opaque, flexible and free from blocking at normal conditions of temperature and humidity during storage, and the polymer being from 60% to 700% by weight, on the weight of fiber, in the tissue.

2. An article as defined in claim 1 in which the polymer also comprises units derived from at least one monomer selected from alkyl acrylates and methacrylates having 6 to 18 carbons in the alkyl group, and acrylates of primary and secondary alcohols having 1 to 5 carbon atoms.

3. An article of manufacture comprising a fibrous tissue having a wet strength of at least 0.04 pound per inch per pound of basis weight comprising haphazardly arranged fibers carrying particles of a thermoplastic copolymer of ethyl acrylate and acrylonitrile having a $T_i$ value of at least 45° C., the total weight of the tissue not including the polymer particles being from 4 to 40 pounds per 500 sheets of 2' by 3' dimensions, said tissue being opaque, flexible and free from blocking at normal conditions of temperature and humidity during storage, and the polymer being from 60% to 700% by weight, on the weight of fiber, in the tissue.

4. An article of manufacture comprising a fibrous tissue having a wet strength of at least 0.04 pound per inch per pound of basis weight comprising haphazardly arranged fibers carrying particles of a thermoplastic copolymer of styrene and acrylonitrile having a $T_i$ value of at least 45° C., the total weight of the tissue not including the polymer particles being from 4 to 40 pounds per 500 sheets of 2' by 3' dimensions, said tissue being opaque, flexible, and free from blocking at normal conditions of temperature and humidity during storage, and the polymer being from 60% to 700% by weight, on the weight of fiber, in the tissue.

5. An article of manufacture comprising a fibrous tissue having a wet strength of at least 0.04 pound per inch per pound of basis weight comprising haphazardly arranged fibers carrying particles of a thermoplastic copolymer of methyl methacrylate and butyl acrylate having a $T_i$ value of at least 45° C., the total weight of the tissue not including the polymer particles being from 4 to 40 pounds per 500 sheets of 2' by 3' dimensions, said tissue being opaque, flexible and free from blocking at normal conditions of temperature and humidity during storage, and the polymer being from 60% to 700% by weight, on the weight of fiber, in the tissue.

6. An article of manufacture comprising a fibrous tissue having a wet strength of at least 0.04 pound per inch per pound of basis weight comprising haphazardly arranged fibers carrying particles of a thermoplastic polymer of methyl methacrylate having a $T_i$ value of at least 45° C., the total weight of the tissue not including the polymer particles being from 4 to 40 pounds per 500 sheets of 2' by 3' dimensions, said tissue being opaque, flexible and free from blocking at normal conditions of temperature and humidity during storage, and the polymer being from 60% to 700% by weight, on the weight of fiber, in the tissue.

7. An article of manufacture comprising a fibrous tissue having a wet strength of at least 0.04 pound per inch per pound of basis weight comprising haphazardly arranged fibers carrying particles of a thermoplastic polymer of vinyl acetate having a $T_i$ value of at least 45° C., the total weight of the tissue not including the polymer particles being from 4 to 40 pounds per 500 sheets of 2' by 3' dimensions, said tissue being opaque, flexible and free from blocking at normal conditions of temperature and humidity during storage, and the polymer being from 60% to 700% by weight, on the weight of fiber, in the tissue.

8. An article of manufacture consisting of an at least partially transparent self-sustaining pellicle comprising a fibrous reinforcement within a matrix formed of a substantially continuous film comprising a water-insoluble thermoplastic synthetic addition polymer having a $T_1$ of at least 45° C. and comprising units derived from at least one monomer selected from the group consisting of alkyl methacrylates in which the alkyl group has 1 to 4 carbon atoms, t-amyl methacrylate, t-amyl acrylate, cyclohexyl acrylate, cyclohexyl methacrylate, benzyl acrylate, benzyl methacrylate, acrylonitrile, methacrylonitrile, styrene, vinyl chloride, chlorostyrene, and p-methylstyrene, said reinforcement being formed from a fibrous tissue comprising haphazardly arranged fibers and having a wet strength of at least 0.04 pound per inch per pound of basis weight, the total weight of fibers in the tissue being from 4 to 40 pounds per 500 sheets of 2' x 3' dimensions, said pellicle being flexible and free from blocking tendencies at normal conditions of temperature and humidity during storage, and the polymer being from 60% to 700% by weight, on the weight of fiber, in the tissue.

9. An article as defined in claim 8 in which the thickness of the pellicle is about 1 to 4 mils.

10. An article as defined in claim 9 in which the polymer comprises a copolymer of acrylonitrile and ethyl acrylate.

11. An article as defined in claim 9 in which the polymer comprises a copolymer of methyl methacrylate and butyl acrylate.

12. An article of manufacture comprising a laminar structure comprising at least one layer consisting of a fibrous reinforcement within a matrix formed of a substantially continuous film comprising a water-insoluble thermoplastic synthetic addition polymer having a $T_1$ of at least 45° C. and comprising units derived from at least one monomer selected from the group consisting of alkyl methacrylates in which the alkyl group has 1 to 4 carbon atoms, t-amyl methacrylate, t-amyl acrylate, cyclohexyl acrylate, cyclohexyl methacrylate, benzyl acrylate, benzyl methacrylate, acrylonitrile, methacrylonitrile, styrene, vinyl chloride, chlorostyrene, and p-methylstyrene, said reinforcement being formed from a fibrous tissue comprising haphazardly arranged fibers and having a wet strength of at least 0.04 pound per inch per pound of basis weight, the total weight of fibers in the tissue being from 4 to 40 pounds per 500 sheets of 2' x 3' dimensions, the polymer being at least about 60% by weight, on the weight of fibrous reinforcement.

13. An article of manufacture comprising a laminar structure comprising a porous substrate and a substantially completely transparent facing layer on the porous substrate, said facing layer consisting of a fibrous reinforcement within a matrix formed of a substantially continuous film comprising a water-insoluble thermoplastic synthetic addition polymer having a $T_i$ of at least 45° C. and comprising units derived from at least one monomer selected from the group consisting of alkyl methacrylates in which the alkyl group has 1 to 4 carbon atoms, t-amyl methacrylate, t-amyl acrylate, cyclohexyl acrylate, cyclohexyl methacrylate, benzyl acrylate, benzyl methacrylate, acrylonitrile, methacrylonitrile, styrene, vinyl chloride, chlorostyrene, and p-methylstyrene, said reinforcement being formed from a fibrous tissue comprising haphazardly arranged fibers and having a wet strength of at least 0.04 pound per inch per pound of basis weight, the total weight of fibers in the tissue being from 4 to 40 pounds per 500 sheets of 2' x 3' dimensions, the polymer being at least about 60% by weight, on the weight of fibrous reinforcement, said facing layer having a smooth, glossy surface and being resistant to moisture, oil, and grease.

14. An article of manufacture comprising a laminar structure comprising a printed paper substrate and a substantially completely transparent facing layer on the porous substrate, said facing layer consisting of a fibrous reinforcement within a matrix formed of a substantially continuous film comprising a water-insoluble, thermoplastic, synthetic addition polymer having a $T_i$ of at least 45° C. and comprising units derived from at least one monomer selected from the group consisting of alkyl methacrylates in which the alkyl group has 1 to 4 carbon atoms, t-amyl methacrylate, t-amyl acrylate, cyclohexyl acrylate, cyclohexyl methacrylate, benzyl acrylate, benzyl methacrylate, acrylonitrile, methacrylonitrile, styrene, vinyl chloride, chlorostyrene, and p-methylstyrene, said reinforcement being formed from a fibrous tissue comprising haphazardly arranged fibers and having a wet strength of at least 0.04 pound per inch per pound of basis weight, the total weight of fibers in the tissue being from 4 to 40 pounds per 500 sheets of 2' x 3' dimensions, the polymer being at least about 60% by weight, on the weight of fibrous reinforcement, said facing layer having a smooth, glossy surface and being resistant to moisture, oil, and grease.

15. An article of manufacture comprising a fibrous tissue having a wet strength of at least 0.04 pound per inch per pound of basis weight comprising haphazardly arranged fibers carrying particles of a water-insoluble thermoplastic, synthetic addition polymer having a $T_i$ value of 45° to 90° C. and comprising units derived from at least one monomer selected from the group consisting of alkyl methacrylates in which the alkyl group has 1 to 4 carbon atoms, t-amyl methacrylate, t-amyl acrylate, cyclohexyl acrylate, cyclohexyl methacrylate, benzyl acrylate, benzyl methacrylate, acylonitrile, methacrylonitrile, styrene, vinyl chloride, chlorostyrene, and p-methyl styrene, the total weight of the tissue not including the polymer particles being from 4 to 40 pounds per 500 sheets of 2' by 3' dimensions, said tissue being opaque, flexible and free from blocking at normal conditions of temperature and humidity during storage, and the polymer being from at least 60% by weight, on the weight of fiber, in the tissue.

16. An article as defined in claim 15 in which the polymer also comprises units derived from at least one monomer selected from alkyl acrylates and methacrylates having 6 to 18 carbons in the alkyl group, and acrylates of primary and secondary alcohols having 1 to 5 carbon atoms.

References Cited in the file of this patent

UNITED STATES PATENTS

| 2,496,665 | Hermanson | Feb. 7, 1950 |
| 2,554,471 | Patterson | May 22, 1951 |
| 2,563,111 | Hampson et al. | Aug. 7, 1951 |
| 2,757,106 | Brown | July 31, 1956 |

OTHER REFERENCES

Serial No. 397,138, Finkentscher (A.P.C.), published May 11, 1943.